US011399101B2

(12) United States Patent
Basir

(10) Patent No.: US 11,399,101 B2
(45) Date of Patent: **\*Jul. 26, 2022**

(54) ROADSIDE AND EMERGENCY ASSISTANCE SYSTEM

(71) Applicant: Intelligent Mechatronic Systems Inc., Waterloo (CA)

(72) Inventor: Otman A. Basir, Waterloo (CA)

(73) Assignee: Intelligent Mechatronic Systems Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,976

(22) Filed: Jan. 10, 2016

(65) Prior Publication Data

US 2016/0205526 A1 Jul. 14, 2016

Related U.S. Application Data

(63) Continuation of application No. 12/405,723, filed on Mar. 17, 2009, now Pat. No. 9,237,242.

(Continued)

(51) Int. Cl.
| | | |
|---|---|---|
| *H04M 11/04* | (2006.01) | |
| *H04W 4/48* | (2018.01) | |
| *H04M 3/51* | (2006.01) | |
| *H04L 67/303* | (2022.01) | |
| *H04L 67/12* | (2022.01) | |
| *H04L 69/18* | (2022.01) | |
| *H04L 69/40* | (2022.01) | |
| *H04W 4/90* | (2018.01) | |
| *H04W 76/50* | (2018.01) | |

(52) U.S. Cl.
CPC ............. *H04M 11/04* (2013.01); *H04L 67/12* (2013.01); *H04L 67/303* (2013.01); *H04L 69/18* (2013.01); *H04L 69/40* (2013.01); *H04M 3/5116* (2013.01); *H04W 4/48* (2018.02); *H04W 4/90* (2018.02); *H04W 76/50* (2018.02)

(58) Field of Classification Search
CPC .. H04M 11/04; H04M 3/5116; H04M 3/5125; H04L 69/18; H04L 69/40; H04L 67/02; H04L 67/303; H04L 67/12; H04W 76/50; H04W 4/48; H04W 4/90
See application file for complete search history.

(56) References Cited

U.S. PATENT DOCUMENTS 5,797,091 A * 8/1998 Clise .................... G08B 25/016
455/564
7,200,409 B1 * 4/2007 Ichikawa ............. G08B 25/016
455/426.1

(Continued)

*Primary Examiner* — Wayne H Cai
(74) *Attorney, Agent, or Firm* — Carlson, Gaskey & Olds, P.C.

(57) ABSTRACT

A system for providing roadside and emergency assistance to a vehicle includes a vehicle unit with several connectivity options. A user interface unit permits a user to request assistance and communicate with an emergency dispatcher and/or service provider. A server receives requests for assistance from the vehicle unit and relays information between the vehicle unit and a dispatcher or service provider to provide communication between the driver of the vehicle and the dispatcher or service provider. Alternatively, such as in an emergency (e.g. crash) situation, the server directly requests assistance to be sent to the vehicle.

15 Claims, 1 Drawing Sheet

Related U.S. Application Data

(60) Provisional application No. 61/037,301, filed on Mar. 17, 2008.

(56) References Cited

U.S. PATENT DOCUMENTS

| | | | | |
|---|---|---|---|---|
| 7,271,716 | B2* | 9/2007 | Nou | G08B 13/19647 340/438 |
| 7,957,744 | B2* | 6/2011 | Oesterling | G07C 5/008 455/412.1 |
| 7,991,381 | B1* | 8/2011 | Dunne | B60R 25/00 379/33 |
| 8,244,307 | B1* | 8/2012 | Tilgner | B60R 11/02 455/569.1 |
| 2004/0192336 | A1* | 9/2004 | Walby | H04W 48/18 455/456.1 |
| 2008/0010560 | A1* | 1/2008 | Morimoto | G06Q 50/10 714/47.1 |
| 2008/0090546 | A1* | 4/2008 | Dickinson | H04M 3/5116 455/404.1 |
| 2008/0299942 | A1* | 12/2008 | Goulder | G01S 5/0009 455/404.2 |
| 2008/0304630 | A1* | 12/2008 | Nguyen | G08B 25/006 455/414.1 |
| 2009/0190735 | A1* | 7/2009 | Gilmartin | B60R 16/0373 379/201.12 |
| 2016/0007159 | A1* | 1/2016 | Dupray | G06Q 30/02 455/456.1 |

\* cited by examiner

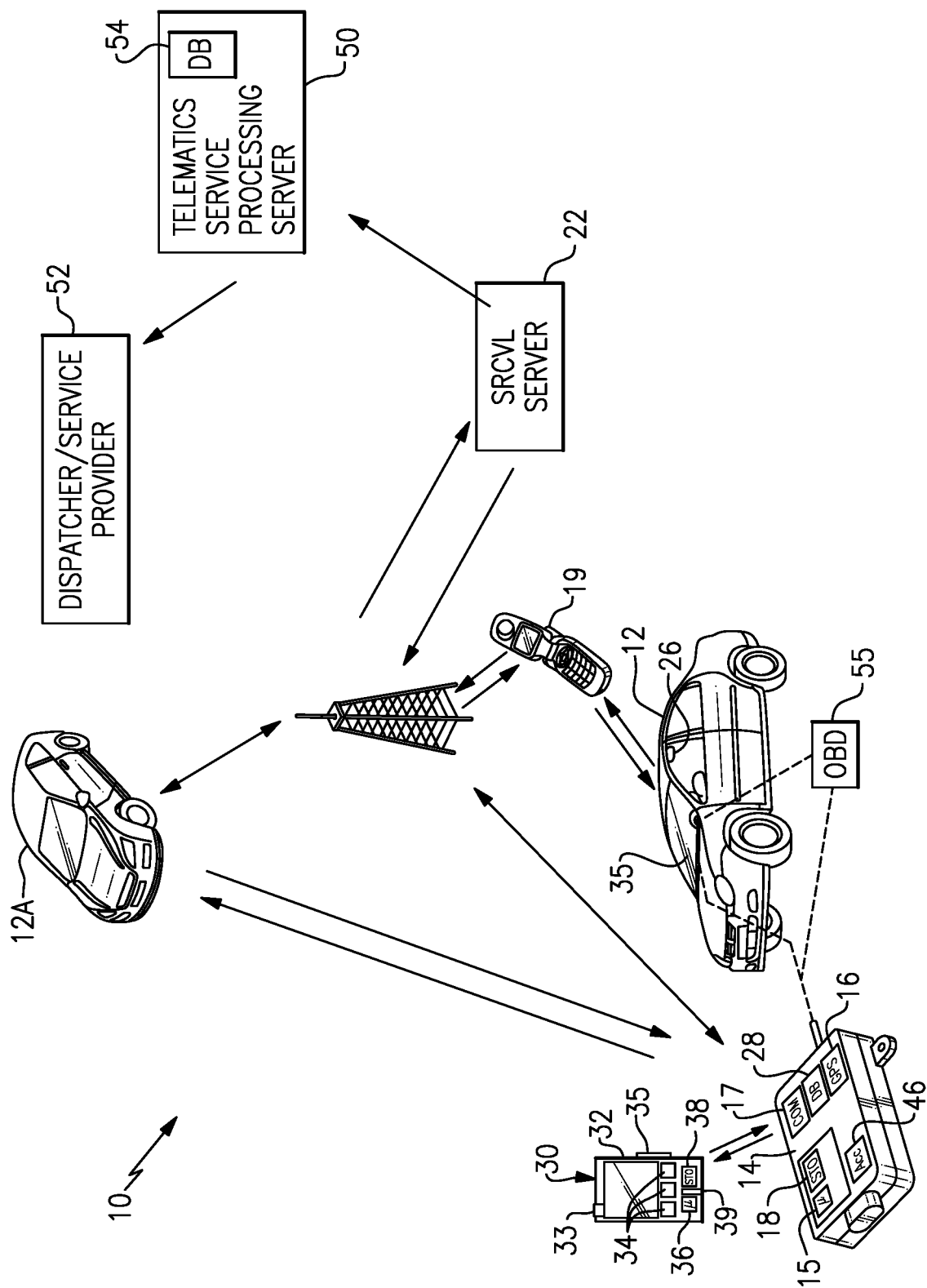

ROADSIDE AND EMERGENCY ASSISTANCE SYSTEM

This application claims priority to U.S. Provisional Application No. 61/037,301, filed Mar. 17, 2008.

BACKGROUND OF THE INVENTION

This invention relates to a system and method for providing roadside and emergency assistance to a vehicle.

Drivers often need roadside assistance with their vehicle, such as when they have a flat tire, the vehicle is stuck in the snow, or is otherwise not functioning. For most drivers, this currently requires the user to call for help with their cell phone. If cell service is unavailable, the driver must walk to get assistance or wait for another passing car to call for assistance.

Frequently, drivers need emergency assistance, such as in the event of a crash. Often, the drivers and passengers in the vehicle are unable to call for emergency assistance themselves.

Some current systems provide emergency and roadside assistance through in-vehicle systems. However, these systems have several weaknesses. For one, they utilize cell phone network connectivity only, which means that assistance will be unavailable where cell coverage is not available.

SUMMARY

The present invention provides a method and system for providing roadside and emergency assistance to a vehicle. The system includes a vehicle unit with several connectivity options. A user interface unit permits a user to request assistance and communicate with an emergency dispatcher and/or service provider. A server receives requests for assistance from the vehicle unit and relays information between the vehicle unit and a dispatcher or service provider to provide communication between the driver of the vehicle and the dispatcher or service provider. Alternatively, such as in an emergency (e.g. crash) situation, the server directly requests assistance to be sent to the vehicle.

BRIEF DESCRIPTION OF THE DRAWINGS

FIG. 1 is a schematic view of the roadside and emergency assistance system of the present invention.

DETAILED DESCRIPTION OF A PREFERRED EMBODIMENT

Referring to FIG. 1, a schematic representation of the system 10 is shown and includes a vehicle unit 14 installed in a vehicle 12. Other vehicles, such as vehicle 12A, would similarly contain vehicle units similar to vehicle unit 14. The vehicle unit 14 is attached and connected to receive power from a vehicle power source. Power from the vehicle 12 can originate from a non-switched fuse box, OBD-II port 55, or other powered connection within the vehicle 12 as known. The vehicle unit 14 includes a computer processor 15 and computer storage 18 (such as memory, hard drive, RAM, ROM, or any kind of electronic, optical, magnetic or other computer readable medium) and is suitably programmed to perform the functions described herein.

Each vehicle unit 14 includes at least one wireless communication circuit 17, such as a Bluetooth communication circuit, GSM, GPRS, CDMA, WiFi, WiMax, cell phone, satellite phone or other wireless communication protocol, and more preferably, more than one protocol. If the wireless communication circuit 17 includes Bluetooth (or equivalent), it can communicate with a wireless device 19, which is preferably a cell phone, smart phone, smart PDA or other portable wireless communication device 19 in order to communicate with cell towers 21. In this manner, the vehicle units 14 are able to exchange information with a Service Request Classification and Vehicle Localization (SRCVL) server 22 and with other vehicles 12A. The SRCVL server 22 includes at least one computer processor and computer storage.

An in-vehicle camera 26 may be provided in the system and connected to the vehicle unit 14. The camera 26 may be mounted to the headliner of the vehicle 12 so that it captures images (still and or video images) of the interior and exterior of the vehicle 12 (such as by using a fish-eye lens).

The system 10 further includes a user interface device 30, which may be portable (wireless) or may be connected to the vehicle unit 14. The user interface device 30 may include a display 32 and user input devices such as buttons 34 (such as on a keyboard), or alternatively, the display 32 could be a touch-screen. The user interface device 30 includes a processor 36, storage 38 (both as previously described), and a communication interface 39, such as a wireless communication interface (e.g. Bluetooth, RF, 802.11, wi-fi, or any other protocol). The user interface device 30 may also include a microphone 33 and speaker 35.

The SRCVL server 22 is in communication (via a wide area network, such as the Internet) with a Telematics Service Processing ("TSP") server 50 (again, with at least one processor and storage and suitably programmed to perform the functions described herein). The TSP server 50 is in communication with many dispatcher/service providers 52 (assistance providers) via a WAN and telephone. The dispatcher/service providers 52 include local emergency assistance providers, such as service dispatchers, 911 operators, fire and police dispatchers, etc. The dispatcher/service providers 52 also include roadside assistance providers, such as tow-truck operators. The TSP server 50 includes a database 54 of the dispatcher/service providers 52, including their locations, contact information and types of services provided.

The vehicle unit 14 includes a configurable database 28 to store mission critical contacts book of telephone numbers and IP addresses of critical dispatch/service providers 52. This information and more is also stored on the SRCVL 22.

The system 10 has the ability to determine the location of the vehicle unit 14 using any of numerous existing techniques (or several). First, the vehicle unit 14 may include a GPS receiver 16. Location could also be determined from a global navigation satellite system, GSM localization, DSRC, WiMAX, etc. Alternatively, or additionally, the server 22 can determine the positions of the devices 19 using triangulation from cell towers 21. Using cell tower triangulation, the location of the device 19 is determined at the servers 22 and can remain at the server 22 or can also be transmitted to the vehicle unit 14. Optionally, the vehicle unit 14 can include a three-axis accelerometer 46 for determining an acceleration or deceleration of the vehicle 12, from which some speed and position information can be determined. The accelerometer 46 can also determine that a collision has occurred and can determine driving habits of the driver (e.g. hard accelerations or decelerations). The vehicle unit 14 also receives speed and heading information from the On Board Diagnostics port OBD 55. Speed and heading can be used to determine location of the vehicle unit 14.

However the location of the vehicle unit 14 (and vehicle 12) is determined, the location and the time spent (or distance driven) in certain geographic areas (e.g. zip codes) may be used to determine insurance rates in several ways. Some insurance premiums are based upon miles driven and based upon geographic areas in which the miles are driven. The premiums may also be based upon the driver's driving habits, such as hard accelerations, speed, time of day, day of the week, type of roads, etc.

The system 10 also provides emergency and/or roadside assistance to the vehicle 12. When a service call is initiated by the vehicle 12 (due to crash as determined by the accelerometer 46, etc) or its operator via the user interface device 30, or on behalf of another vehicle 12A (or its operator) in its vicinity, a connection to the SRCVL 22 is attempted using one or more of the connection options provided by communication device 17. The vehicle unit 14 provides automatic detection and failover between the various available connectivity options. If the service request is time critical and a connection was not realized or an acknowledgment is not received within a prescribed time threshold from the SRCVL server 22, the vehicle unit 14 will attempt to connect directly to the appropriate dispatch/service provider 52 using the information stored in its mission critical contact book in database 28. If a direct connection is not realized, an attempt will be made to establish a connection via another vehicle 12A in the vicinity, who in turn tries to contact the SVCL 22, the dispatch/service provide 52 or yet another vehicle, and so on, and so on. The process is repeated until a connection is established.

If a roadside assistance request is made by the vehicle operator, the user presses the roadside assistance button on the user interface device 30. The user interface device 30 forwards the request to the vehicle unit 14. The vehicle unit 14 determines (or already knows) the current location of the vehicle 12, vehicle speed, heading, the level of precision of position fix, and current time/date. The vehicle unit 14 acquires (or has already acquired) vehicle data and diagnostics information from the vehicle's OBD system 55.

The vehicle unit 14 attempts a connection to the SRCVL server 22 as above. A roadside assistance message is created (containing the timestamp, various diagnostic data and parameters such as location (and precision of location), speed, heading) and is forwarded to SRCVL server 22.

The SRCVL server 22 validates the request and processes it to look up a 10-digit telephone number associated with the vehicle unit 14. The SRCVL server 22 also validates and processes the vehicle geographical location (e.g. convert to street address or location with respect to a landmark) and vehicle travel direction (e.g, on street xy moving east to west).

The SRCVL server 22 also processes information from the vehicle unit 14 to determine vehicle 12 health condition. The SRCVL server 22 creates a Telematic Service request including of a summary of the request, level of urgency, and a classification of the service requested and forwards it to the TSP server 50. The TSP server 50 sends a location response message containing a unique confirmation identifier if it successfully receives the service request. The SRCVL server 22 receives and stores the confirmation identifier.

Based on the Telematic Service request, the vehicle location, class and the summary, the TSP server 50 determines the best dispatch/service provider 50 to respond to the request. The TSP server 50 connects to the appropriate dispatch/service provider 50. The TSP server 50 provides the dispatch/service provider 50 information such as vehicle location, vehicle IP or Phone Number, requested service type, a summary of requested service including vehicle information, and time when service was requested.

The dispatch/service provider 50 delivers the requested service to the requesting vehicle 12 by either attending to the vehicle 12 physically, or by contacting the vehicle 12 using phone or internet. This communication can be proactive i.e, the dispatch/service provider 50 initiates the call to the vehicle 12 (more specifically to the vehicle unit 14 or to the mobile device 19), or reactive, i.e, dispatch/service provider 50 anticipates a call from the vehicle 12 (i.e. the vehicle unit 14 or to the mobile device 19).

If TSP server 50 manages to determine the dispatch information successfully, the SRCVL server 22 will forward the dispatch/service provider 50 telephone number to the vehicle 12 that initiated the request. The vehicle 12 that initiated the request will use the received telephone number to initiate two-way voice communication with the dispatch/service provider 50. The vehicle unit 14 may initiate automatic dialing of the received dispatch/service provider 50 telephone number. If the dialed number is busy the vehicle unit 14 will retry at least one additional time. The dispatch/service provider 50 is reached and the roadside assistance request is handled directly between the vehicle 12 operator and the dispatch/service provider 50. The user can speak to a dispatcher via the microphone 33 and speaker 35 on the user interface device 30. If the vehicle unit 14 is unable to communicate via phone (such as, lack of cell coverage), the dispatch/service provider 50 may dispatch assistance to the vehicle 12 directly based upon the location of the vehicle 12, to the extent it is known.

In the event that the vehicle unit 14 detects a crash, the same connection process is attempted to SRCVL server 22; however, in addition to the information transmitted as described above, the urgency of the request is flagged as critical to ensure timely response. The vehicle unit 14 also transmits a video capture of ten seconds before the crash, ten seconds after the crash (and including the crash), other crash intensity and type and other crash parameters (such as vehicle speed during the video capture times, accelerometer 46 measurements), number of occupants in the vehicle, and continuous feed of temperature in the vehicle 12. The SRCVL server 22 in this case will contact an emergency response provider (of the dispatch/service providers 52) and provide them with all of the information received from the vehicle unit 14.

For a more routine maintenance request, the vehicle unit 14 initiates a connection only if it can do so using its communication circuit 17. The SRCVL server 22 forwards information to maintenance service providers (of the dispatch service providers 52), e.g, a car dealership, or SRCVL server 22 will email a maintenance reminder with report summary to vehicle owner/operator. A copy of the report is stored on SRCVL server 22.

Failure Handling

There are a number of points of failure that must be handled. These failures include, lack of GPS connectivity, no GSM network coverage (or the relevant protocol), SRCVL server 22 unavailable, and TSP server 50 unavailable. These failures and how they are to be handled are described below.

Lack of GPS Connectivity

If the vehicle unit 14 is experiencing a lack of GPS connectivity with GPS receiver 16, the vehicle unit 14 will initiate a roadside assistance request to SRCVL server 22 with the last known position of the vehicle 12 collected through the GPS receiver 16. This position will be aged (5 minutes) and if it is detected that the position is reasonably accurate it will be passed to the SRCVL server 22 for processing. If the position has aged passed the state of usability, then the 'ERS Access Number' shall be used.

No GSM/CDMA Network Coverage

The vehicle unit 14 will indicate to the user (such as by displaying through an LED display that GSM/CDMA network coverage cannot be obtained via the message "No GSM/CDMA Network Coverage"). In this case an attempt will be made to connect through wifi or wimax if detected in the surrounding. If wifi or wimax is not available an attempt will be made to establish a connection via other cars in the area via Bluetooth or another wireless connection.

Servers Unavailable

The vehicle unit 14 will dial a HELP number for instances when either the SRCVL server 22 and/or the TSP server 50 are unavailable.

The vehicle unit 14 may also provide timely, voice-driven notification of upcoming roadside emergencies (as received from the SRCVL server 22 or another server) that are tailored to the location of the vehicle 12. This feature proactively delivers valuable information through the existing infrastructure, and can be used for severe weather conditions, traffic incidents, and other dangers to assist in the avoidance of roadside emergencies.

In this document, the term "server" is used broadly, as it is understood that a "server" may include many hardware-independent computers that may even be in different geographic locations. Further, it should be recognized that the SRCVL server 22 and TSP server 50 could be implemented in a single server.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

The invention claimed is:

1. A roadside assistance system comprising:
   a vehicle unit installed in a vehicle, the vehicle unit including a processor and at least one wireless communication circuit;
   a user interface device including a touch-screen display, a processor, and a communication interface for communicating with the vehicle unit, the user interface device being in communication with the vehicle unit and permitting a user to initiate a roadside assistance request in which the roadside assistance request includes a location of the vehicle, a timestamp, a speed of the vehicle, and a heading of the vehicle, and the roadside assistance request is transmitted to a first remote server, the roadside assistance system being further configured to directly communicate the roadside assistance request to a roadside assistance provider; and
   including the first remote server, wherein the first remote server provides a telephone number of the vehicle to an assistance provider in response to the assistance request.

2. The system of claim 1 wherein the at least one wireless communication circuit of the vehicle unit communicates the roadside assistance request wirelessly to the first remote server.

3. The system of claim 2 wherein the vehicle unit transmits vehicle diagnostic information from an on-board diagnostics system with the roadside assistance request.

4. The system of claim 3 wherein the at least one communication circuit of the vehicle unit is capable of transmitting the roadside assistance request via a plurality of wireless protocols.

5. The system of claim 4 wherein the vehicle unit automatically transmits the roadside assistance request via a second one of the plurality of protocols if a first one of the plurality of protocols is unavailable.

6. The system of claim 3 wherein the at least one communication circuit of the vehicle unit is capable of transmitting the roadside assistance request via a mobile device.

7. The system of claim 2 wherein the vehicle unit is programmed to automatically communicate with a roadside assistance provider directly if the first remote server is unavailable.

8. The system of claim 7 wherein the roadside assistance provider is a tow truck operator.

9. The system of claim 1 wherein the system includes a second remote server, the first remote server sending the second remote server the assistance request, the second remote server selecting an assistance provider based upon the roadside assistance request.

10. The system of claim 1, wherein the location of the vehicle includes a precision of the location.

11. A method of requesting assistance from a vehicle including the steps of:
    a) generating an assistance request from a mobile device;
    b) the mobile device communicating with a vehicle unit installed in the vehicle;
    c) transmitting information and the assistance request directly to a roadside assistance service provider based upon said steps a) and b), wherein the roadside assistance service provider is a tow truck operator;
    a first remote server, wherein the first remote server provides a telephone number of the vehicle to an assistance provider in response to the assistance request; and
    a second remote server, the first remote server sending the second remote server the assistance request, the second remote server selecting a roadside assistance provider based upon the assistance request.

12. The method of claim 11 wherein said step c) further includes transmitting vehicle diagnostic information with the assistance request.

13. A method of requesting assistance from a vehicle including the steps of:
    a) generating an assistance request from a mobile device;
    b) transmitting vehicle diagnostic information, vehicle location and the assistance request to a first remote server;
    c) sending the assistance request from the first remote server to a second remote server in response to the first remote server receiving the assistance request;
    d) the second remote server selecting roadside assistance provider based upon the assistance request; and
    e) the second remote server providing a telephone number of the vehicle to the selected roadside assistance provider in response to the assistance request.

14. The method of claim 13 further including the step of providing the telephone number of the vehicle from the first remote server to the second remote server.

15. A roadside assistance system comprising:
- a vehicle unit installed in a vehicle, the vehicle unit including a processor and at least one wireless communication circuit;
- a user interface device including a touch-screen display, a processor, and a communication interface for communicating with the vehicle unit, the user interface device being in communication with the vehicle unit and permitting a user to initiate a roadside assistance request in which the roadside assistance request includes a location of the vehicle, a timestamp, a speed of the vehicle, and a heading of the vehicle, and the roadside assistance request is transmitted to a first remote server, the roadside assistance system being further configured to directly communicate the roadside assistance request to a roadside assistance provider; and
- including the first remote server, the first remote server providing a telephone number of the vehicle to an assistance provider in response to the roadside assistance request, and a second remote server in communication with the first remote server, the second remote server being configured to select the assistance provider from a plurality of roadside assistance providers based upon the roadside assistance request.

* * * * *